United States Patent
Srinivasan et al.

(10) Patent No.: US 7,330,839 B2
(45) Date of Patent: Feb. 12, 2008

(54) METHOD AND SYSTEM FOR DYNAMIC PRICING

(75) Inventors: Kannan Srinivasan, Gibsonia, PA (US); Michael I. Shamos, Pittsburgh, PA (US)

(73) Assignee: Intellions, Inc., Mars, PA (US)

( * ) Notice: Subject to any disclaimer, the term of this patent is extended or adjusted under 35 U.S.C. 154(b) by 764 days.

(21) Appl. No.: 09/804,729

(22) Filed: Mar. 13, 2001

(65) Prior Publication Data

US 2001/0051932 A1 Dec. 13, 2001

Related U.S. Application Data

(60) Provisional application No. 60/188,891, filed on Mar. 13, 2000.

(51) Int. Cl.
*G06Q 99/00* (2006.01)

(52) U.S. Cl. .................... 705/400; 705/10; 705/14; 705/26; 709/217

(58) Field of Classification Search .............. 705/1, 705/14, 10, 26–27, 400
See application file for complete search history.

(56) References Cited

U.S. PATENT DOCUMENTS

| | | | |
|---|---|---|---|
| 6,101,484 A * | 8/2000 | Halbert et al. ................ | 705/26 |
| 6,285,983 B1 * | 9/2001 | Jenkins ........................ | 705/10 |
| 6,578,014 B1 * | 6/2003 | Murcko, Jr. .................. | 705/26 |
| 6,810,385 B1 * | 10/2004 | Brady et al. .................. | 705/18 |
| 6,976,000 B1 * | 12/2005 | Manganaris et al. .......... | 705/10 |
| 2001/0014868 A1 * | 8/2001 | Herz et al. .................... | 705/14 |
| 2001/0027455 A1 * | 10/2001 | Abulleil et al. ............... | 705/10 |

FOREIGN PATENT DOCUMENTS

JP 2001-117999 A * 4/2001

OTHER PUBLICATIONS

"Pilot Software Announces Retail Performance Monitor; Pre-Defined Retail Applications for Merchandise, Operational Analysis"; Nov. 23, 1998; Business Wire. New York. p. 1.*

* cited by examiner

*Primary Examiner*—John W. Hayes
*Assistant Examiner*—Freda A Nelson
(74) *Attorney, Agent, or Firm*—Ference & Associates LLC

(57) ABSTRACT

The method and system of the present invention enables Internet businesses to conduct real-time, online experiments on a sample of transactions to determine marketplace sensitivities. Analysis of the results of the experiments reveal optimal values of key market decision variables such as price, content of banner ads, promotion levels, quantity discount schemes, etc. The experiments may be automatically conducted on an on-going basis, or may be conducted on a periodic basis. The method and system of the present invention preferably allow users to modify the nature of the experiment and the propagation of optimal values. The method and system of the current invention can be used for a pure diagnostic purpose or to automate the setting of key market variables. The dynamic experimentation used by the inventive system reveals the relative stability (or instability) of the networked market within which the business operates. The translation of an optimal value for a key variable (for example, price) to the entire market can be done on a real-time basis.

20 Claims, 5 Drawing Sheets

METHOD AND SYSTEM FOR DYNAMIC PRICING

CROSS-REFERENCE TO RELATED APPLICATIONS

This invention relates to U.S. Provisional Application No. 60/188,891, filed Mar. 13, 2000, which is incorporated by reference herein in its entirety.

FEDERALLY SPONSORED RESEARCH

Not Applicable.

BACKGROUND OF THE INVENTION

1. Field of the Invention

The disclosed invention relates to dynamically pricing goods and services in real-time over the Internet through controlled short-term experiments that determine customer price sensitivity.

2. Description of the Background

In traditional commerce, prices are typically static, with change only occurring with major market changes. This has resulted in part because the costs associated with printing fixed-price catalogs, marking goods with prices and advertising prices in the media. Furthermore, it is difficult to offer different prices to different purchasers in a traditional setting in which prices are published or made publicly available.

However, e-commerce does not have to be so restricted. The introduction of e-commerce on the Internet has made it easier for Internet merchants to change prices by simply updating a Web page or appropriate database/systems. The costs associated with printing catalogs and marking goods in a bricks-and-mortar setting are typically not present in eCommerce. In addition, it is also possible to offer different prices to different customers without either customer learning the price that has been offered to the other.

Although it is possible for Internet merchants to update prices at any time, typically they have not done so. One reason for sticking to static pricing strategies is that merchants are accustomed to keeping prices static. In some cases, merchants have both brick-and-mortar shops and Web shops, and want to keep prices in alignment. However, the primary reason why Internet merchants do not dynamically adjust prices with the ever-changing marketplace is that the merchants do not have the ability to dynamically determine optimal prices.

The Internet is a dynamic marketplace. As e-commerce becomes a dominant force, the ability to dynamically adjust to and exploit changes in the Internet marketplace becomes critical. An enormous amount of detailed, disaggregate information is being routinely captured during Internet transactions. The ability to gather real-time information on transactions conducted on the Internet means that Internet merchants could use the information to dynamically update their websites to take maximum advantage of market conditions. In particular, real-time transaction information opens up the possibility of dynamic pricing and marketing.

However, using the information to determine the dynamic, optimal price is problematic. Although a great deal of real-time transactional information is available, businesses have no current method of being able to analyze the information in a manner that provides guidance to dynamically updating pricing, marketing, promotions and other key market variables.

As enterprises move into high velocity environments in a networked economy, decisions based on data are ever more critical and can be leveraged to affect the bottom line. In this environment, information is highly valuable but comes with a high discount rate. That is, the value of the information rapidly depreciates. Current generation data analysis and data mining methods do not effectively deal with this type of information, as current methods rely on a time-consuming sequential process of data gathering, analysis, implementation and feedback.

Current systems including data mining methodologies are retrospective, and there is a significant lag in analysis time. The dynamic nature of the Internet makes even recent information obsolete.

Some efforts have been made to use computer systems to estimate supply and demand, to adjust prices to perceived market conditions, or to vary prices based on the identity and purchasing history of the customer.

U.S. Pat. No. 5,752,238 discloses a consumer-driven electronic information pricing mechanism including a pricing modulator and pricing interface contained with a client system. However, in this reference, the customer selects from a menu of pricing options. It does not disclose or teach a real-time determination of price sensitivities.

U.S. Pat. Nos. 5,822,736 and 5,987,425 disclose a variable margin pricing system and method that generates retail prices based on customer price sensitivity in which products are grouped into pools from a first pool for the most price sensitive products to a last pool for the least price sensitive products. However, the price sensitivities are determined manually by the storekeeper based on his subjective impressions and are not obtained in real-time.

U.S. Pat. No. 5,878,400 discloses a method and apparatus for computing a price to be offered to an organization based on the identity of the organization and the product sought, but does not teach or suggest real-time price determination.

U.S. Pat. No. 5,918,209 discloses a method and system for determining marginal values for perishable resources expiring at a future time, such as an airline seat, hotel room night, or rental car day for use in a perishable resource revenue management system. Data for the perishable resources and composite resources is loaded from the perishable resource revenue management system into the marginal value system. The marginal values for the perishable resources are determined using a continuous optimization function using interdependencies among the perishable resources and the composite resources in the internal data structures. However, this reference does not disclose or teach elicitation of price sensitivities based on measuring customer behavior.

U.S. Pat. No. 5,926,817 discloses a client-server system and method for providing real-time access to a variety of database systems, one application of which is "dynamic price quoting." However, the reference uses this phrase to mean computing a single price to be quoted to a customer based on information about the user's requirements and data contained in the supplier's databases. It does not teach or suggest experimentation to determine marketplace customer price sensitivity.

In general, the prior art teaches that it is useful to attempt to measure supply and demand as an aid in determining prices. It is also known to utilize previously accumulated facts about a purchaser to influence the price at which a particular product should be offered to him. However, the applicants are not aware of any prior art in which price and other market sensitivities are measured directly through use of controlled real-time experiments.

In view of the foregoing, it can be appreciated that a substantial need exists for a method and system for dynamic optimal pricing of products and services.

SUMMARY OF THE INVENTION

The inability to effectively exploit Internet transaction information is overcome by the method and system of the present invention, which enables Internet businesses to conduct real-time, online experiments on a sample of transactions and determine marketplace sensitivities. Analysis of the results of the experiments reveal optimal values of key market decision variables such as price, content of banner ads, promotion levels, quantity discount schemes, etc. The experiments may be automatically conducted on an ongoing basis, or may be conducted on a periodic basis. The system offers total flexibility to the users to conduct and control the experiments. The experimental process is based upon rigorous statistical and econometric principles.

A manager using the method and system of the present invention can control the extent and speed with which market strategies are updated. The method and system of the present invention preferably allow managers to modify the nature of the experiment and the propagation of optimal values. Managers make the key business decisions, which are silently and seamlessly translated into the Internet merchant's eCommerce system.

For example, the profit-maximizing price determined from a dynamic experiment conducted by the system of the present invention might be 5% higher than the currently offered price. The manager might use this information for purely diagnostic purposes and thus gain insights into the price sensitivity of the market. Alternatively, the manager might automate the process of changing the offered price to the optimum price determined by the system of the present invention whenever the optimal profit, for example, is 20% or more than current settings. Thus, the method and system of the current invention can be used for a pure diagnostic purpose or to automate the setting of key market variables.

The dynamic experimentation used by the inventive system reveals the relative stability (or instability) of the networked market within which the business operates. The translation of an optimal value for a key variable (for example, price) to the entire market can be done on a real-time basis.

Continuous real-time modeling with appropriate integration to existing systems on critical factors like price, promotion, financing, content, discount schemes and product bundling give companies using the method and system of the present invention a huge competitive advantage.

One embodiment of the invention comprises a method of dynamically determining an optimal price to be charged for a product on an Internet website operated by an Internet merchant, comprising the steps of receiving configuration data from the Internet merchant; randomly sampling visitors to the Internet website according to the configuration data; determining an optimal price using the data acquired from sampling; and displaying the optimal price to the Internet merchant.

With these and other advantages and features of the invention that will become hereinafter apparent, the nature of the invention may be more clearly understood by reference to the following detailed description of the invention, to the appended claims and to the several drawings attached herein.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Reference will now be made in detail to the embodiments of the invention, examples of which are illustrated in the accompanying drawings. Wherever possible, the same reference numbers will be used throughout the drawings to refer to the same or like components.

It is worthy to note that any reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Figure 1A:
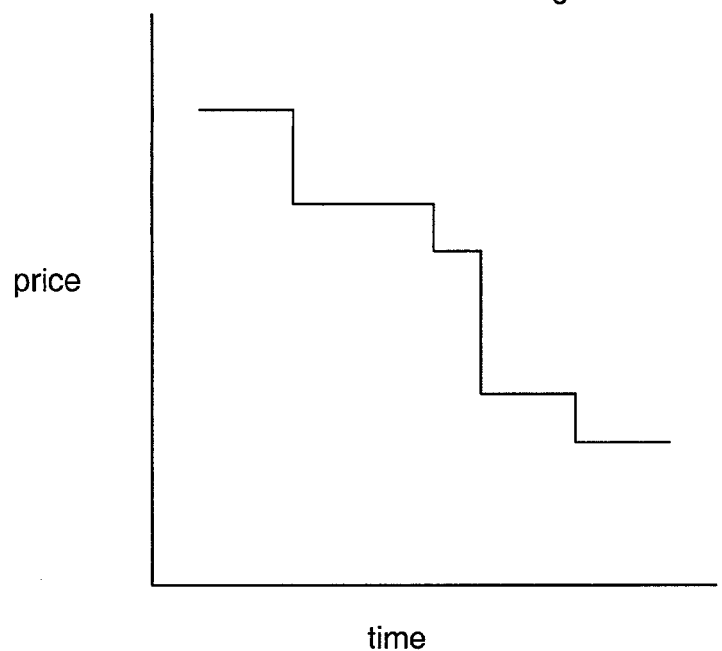
FIG. 1A is a schematic illustration of traditional pricing using a step function.

FIG. 1A illustrates a current pricing methodology that is used by many businesses today. As shown, the price steps down in increments over time. This type of step pattern occurs when a merchant sets a price for a product, then after a certain amount of time, becomes aware that competitors are charging a lower price, or that demand is waning for the product. The merchant will then lower the price of the product to become more competitive.

An example of businesses that may exhibit such step function pricing behavior is a business selling a new product that is initially very popular, then tapers off as the products are sold, such as a B2C e-books retailer selling the Harry Potter books. Another example is a B2B components exchange that increases a bulk discount as the number of transactions increases. The reductions taken may be determined by historic market data, or may be a subjective determination that is not based on any particular market data. It is not possible for the merchant to determine current market condition when updating prices.

Figure 1B:
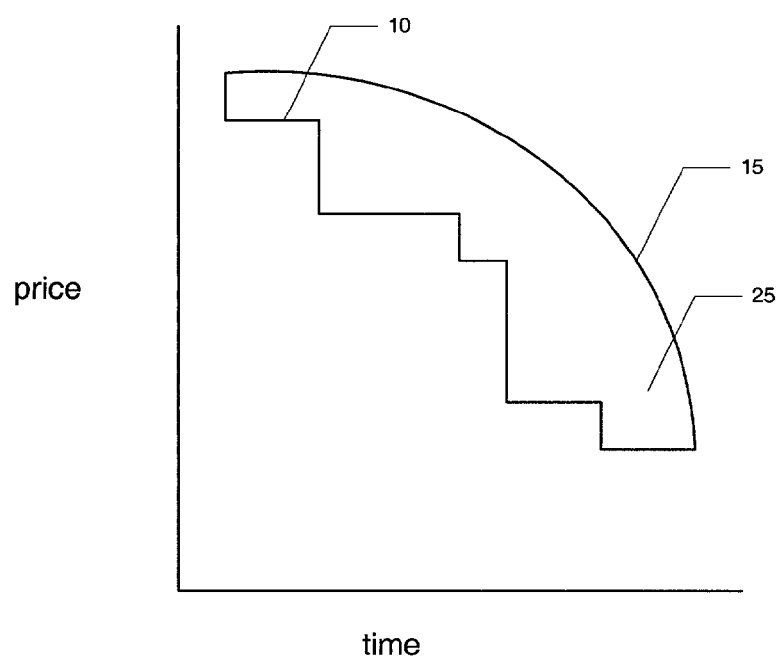
FIG. 1B is a schematic illustration of the currently unrealized profits that may be attained by using the dynamic pricing scheme of the present invention.

FIG. 1B illustrates an actual demand function for the product as demand curve 15. The area 25 between the demand curve 15 and the traditional price step function 10 represents the unrealized profit to the merchant for not being able to match current prices with the actual demand curve. The demand curve in FIG. 1B assumes that the variable cost is zero, and therefore the price is the profit to the merchant. The demand curve shows a customer's actual valuations of the product assuming all customers have the same valuation function. The step function shows the actual price charged over time. As is illustrated, substantial profits may be realized if the price could be dynamically set to match market conditions.

The method and system of the present invention utilize limited sampling to determine real-time market sensitivity. This sampling provides data that can be used to create a real-time model that is analyzed to determine optimal values for many key market variables, such as price, promotions, advertising content and product management. The method and system of the present invention allow for customized dynamic pricing with promotions, discounts and bundling.

The method and system of the present invention enables a company using the system to offer different promotions to different customers. The method and system of the present invention may be used to segment the market, and managers using the system of the present invention may be informed of an optimal price for each market segment.

Architecture

Figure 2:
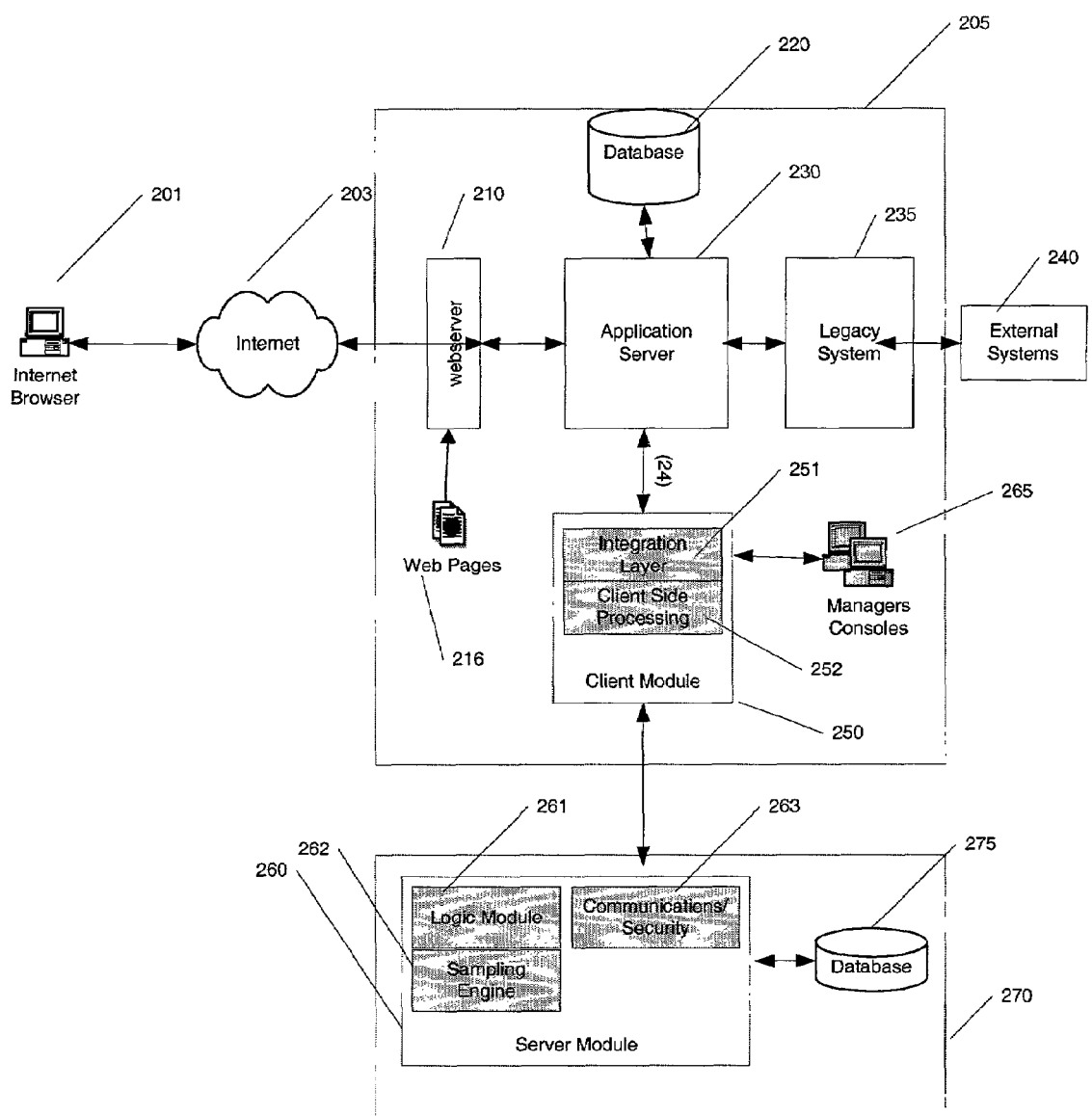
FIG. 2 illustrates one embodiment of a system architecture that may be used by the method and system of the present invention.

FIG. 2 illustrates one embodiment of a system architecture for the system of the present invention. In this embodiment, a potential customer visits a website run by an Internet merchant and conducts eCommerce by purchasing one or more products from the Internet merchant through the website.

In the embodiment shown, the customer uses an Internet browser 201 on his computer to access an eCommerce site operated by an Internet merchant, such as Amazon.com. The Internet browser 201 may be any known to those skilled in the art, such as Microsoft Explorer or Netscape Communicator, for example. Preferably, HyperText Transfer Protocol (HTTP) or its more secure version HTTPS is used to communicate with the website. These are popular communication protocols used on the Internet to exchange information. Other communication protocols are known to those skilled in the art, and are intended to come within the scope of the present invention.

In an alternative embodiment not shown, the customer may be using a wireless handheld device to access the website.

Once the customer has accessed the eCommerce website, he can request information, such as current prices, from the website. The request sent by the browser might include information specific to the customer using the browser. Such information may include, for example, information derived from user logins, cookies stored on the user's machine and through the user's IP address.

The customer's browser 201 communicates with an Internet merchant's eCommerce system 205. The eCommerce system 205 is an integrated system that comprises different kinds of hardware and software sub-systems. The eCommerce system performs the functions needed to run the Internet merchant's Website.

Webservers are usually the entry point into an eCommerce system 205 from the perspective of a software program. The Webserver 210 on the eCommerce system is mainly responsible for delivering webpages to a browser across the Internet. Webpages are the pages that the user sees in the browser. The Webserver 210 runs software that receives and processes requests for webpages from users. The webpages may be stored as files on a storage disk that the Webserver reads and sends to the requesting browser. This is shown by 216. Alternatively, Webserver 210 may generate the webpage by gathering information from other sources, such as software programs, and then send it to the browser. For example, Webpages are often generated with data retrieved from an Application Server.

The Webserver 210 may be any type of known webserver, such as Microsoft IIS, or Netscape NES. The architecture shown in FIG. 2 also shows optional database 220. The database may be used by the eCommerce system 205 to store Internet merchant information, such as customer account records. Database 220 may be any known database type, such as Oracle, Sybase, DB2, etc.

In addition, the Internet merchant may have one or more Legacy Systems 235. For example, all customer data may be stored on a Legacy System.

In many cases eCommerce systems interact with external systems, as shown by 240. For example, a trading exchange may receive catalogs from several external systems and store them in its own system. It may then present items from the catalogs to interested buyers. The eCommerce system 205 may communicate with external systems over the Internet or through a dedicated Frame Relay Circuit, or any other type of connection mechanism.

Because Webservers usually do not perform business logic data processing, the architecture typically includes an Application Server 230. The Application Server 230 may perform most business specific logic operations and send data to the Webserver, which processes the data and sends formatted output to the user for display. For example, the Application Server may retrieve a customer's bank account information, which is used as part of an Order Confirmation webpage generated by the Webserver.

Interprocess communications between the Application Server and the Webserver are typically supported by the underlying operating system. For example, for JAVA based platforms, the communication protocol may be RMI/IIOP (Remote Method Invocation/Internet Inter-ORB Protocol). The programs communicating via these methods may or may not reside on the same physical computer. Similar methods may be used for the communications between the Application Server and the Client Module, which is described below.

Communications between a Legacy System and Application Server may be accomplished using commercially available software, such as IBM's MQ, Microsoft's MSMQ or Tibco software. The software used depends on the needs and the underlying operating systems.

The manager's console 265 contains software similar to browser software for displaying output from the inventive system to an employee of the Internet merchant, typically a management-level employee. It is used to manage the experiments run by the inventive system. It is used to configure experiments and display run-time progress data on the experiment. It may also be used to display data on past experiments.

The client module 250 of the present invention is integrated in the eCommerce system 205. Client Module 250 typically consists of an Integration Layer 251 and a Client Side Processing module 252. Collectively, it takes as input experiment parameter values and sends them to the Server Module 260 for processing. It receives output from the Server Module 260, and disseminates the output to the Application Server 230 and/or the Manager's Console 265 for display.

The Client Side Processing Module 252 is responsible for processing all the input received from the eCommerce System, typically through the Application Server 230, and delivering it to the Server Module 260. The input is typically a continuous stream of parameters used to conduct and manage an ongoing experiment. The Client Processing Module 252 establishes and maintains a secure communication channel with the Server Module and may also perform session management.

The Integration layer 251 helps the Client Side Processing module 252 run on a variety of systems. It acts as an interpreter between the eCommerce System and the Client Side Processing module 252. It may be different for different systems. This enables the Client Side Processing module 252 to remain the same, no matter what type of operating system is being used. In an alternative embodiment, the Client Side Processing module may be developed for a specific eCommerce system and runs without an Integration Layer.

Communications between the Client Module 250 and the Server Module 260 typically use HTTPS to ensure security. Data may be transmitted in eXtensible Markup Language (XML) format.

The Dynamic Pricing System 270 includes sub-systems, computers and communications systems, including Server Module 260, that are used to perform the sampling and resultant analysis. It receives input data, performs statistical calculations and feeds the output to the eCommerce system 205. Typically, the output from the Dynamic Pricing System 270 is used by the Application Server 230 in performing the business specific logic.

Server Module 260 may contain Logic Module 261, Sampling Engine 262 and Communications Module 263. Server Module 260 is responsible for receiving input from Client Module 250, performing the experimentation and analysis, and outputting results to Client Module 250. These actions are all performed in a secure environment.

Sampling Engine 262 contains statistical functionality that performs the various experiments. Logic Module 261 contains the algorithms that are used to perform various types of analyses on the sampled data.

The Communications module 263 is responsible for securely communicating data to and from the Client Module.

Database 275 may be used to store historical data and other data regarding the experiments for processing, report generation and future retrieval.

The architecture shown in FIG. 2 is an ASP-based solution, where the Server Module 270 is hosted on a remote system with a network connection to the eCommerce system 205. In an alternative embodiment, the Dynamic Pricing System 270 may reside within the eCommerce system 205.

Figure 3:
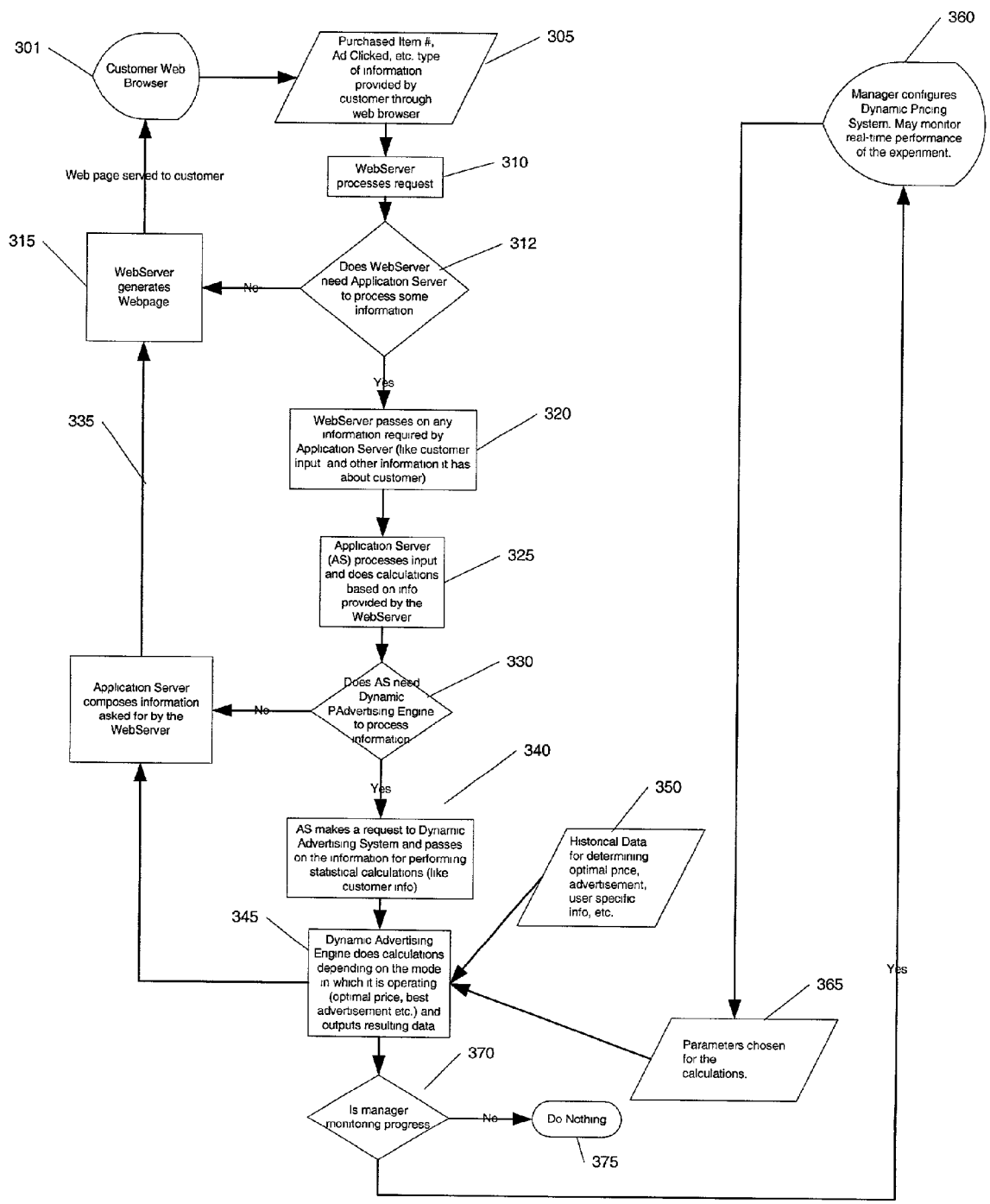
FIG. 3 illustrates one embodiment of software system data flow in the method and system of the present invention.

FIG. 3 illustrates how data may flow through the inventive system.

As shown by entity 360, a management-level employee for the Internet merchant using the inventive system configures the Dynamic Pricing System with parameters. For example, the employee may enter a price range and number of samples to be used in the experiments. The employee may also actively monitor the performance of the experiment(s).

These parameters are used as input into the Dynamic Pricing System as shown by data 365. These parameters configure the sampling engine subsystem of the Dynamic Pricing System.

As shown by entity 301, a customer uses a browser to access an eCommerce website. When the customer makes a request, several different types of data items may be sent to the Webserver, as shown by 305. The Webserver processes the information at step 310. If the request from the customer does not require Application Server processing, then the Webserver can go ahead and generate the appropriate Webpage, as shown by steps 312-315. However, if additional processing is needed, the Webserver will pass on information to the Application Server at step 320. Based on the information provided by the Webserver, the Application Server processes the input and performs any needed calculations at step 325.

During step 325, the Application Server will determine whether it needs the Dynamic Pricing System to process data. For example, there may be a current ongoing experiment to determine the optimal price or optimal advertising content, etc.

If the Application Server does not need the Dynamic Pricing System to process information, it composes the requested information using input from its own calculations, databases and/or legacy systems, as shown by steps 330-335.

Otherwise, the Application Server makes a request to the Dynamic Pricing System and passes on any information required by the Dynamic Pricing System for performing the statistical calculations, as shown by step 340.

The Dynamic Pricing System may use historical data in its calculations as shown by data 350. In addition, the parameters 365 entered by the Internet Merchant are used in the calculations that the Dynamic Pricing System performs.

The Dynamic Pricing System performs the calculations as required, and outputs the resulting data at step 345. The Application Server composes the requested information at step 335 using the output from 345.

If the manager is actively monitoring the progress of the experiment, he will be informed of the progress as shown by steps 370-360.

The sampling engine 262 of the Dynamic Pricing System may be used by many different applications to obtain information about current market conditions. These applications use the sampling data to determine optimal pricing, promotions, product bundling, lead time discounts, quantity discounts, price versus financing and type and content of banner ads, for example. The Logic Module contains the algorithms to perform the different types of analyses required by different applications. Other applications of the sampling data will be known to those skilled in the art and are intended to come within the scope of the present invention.

Figure 5:
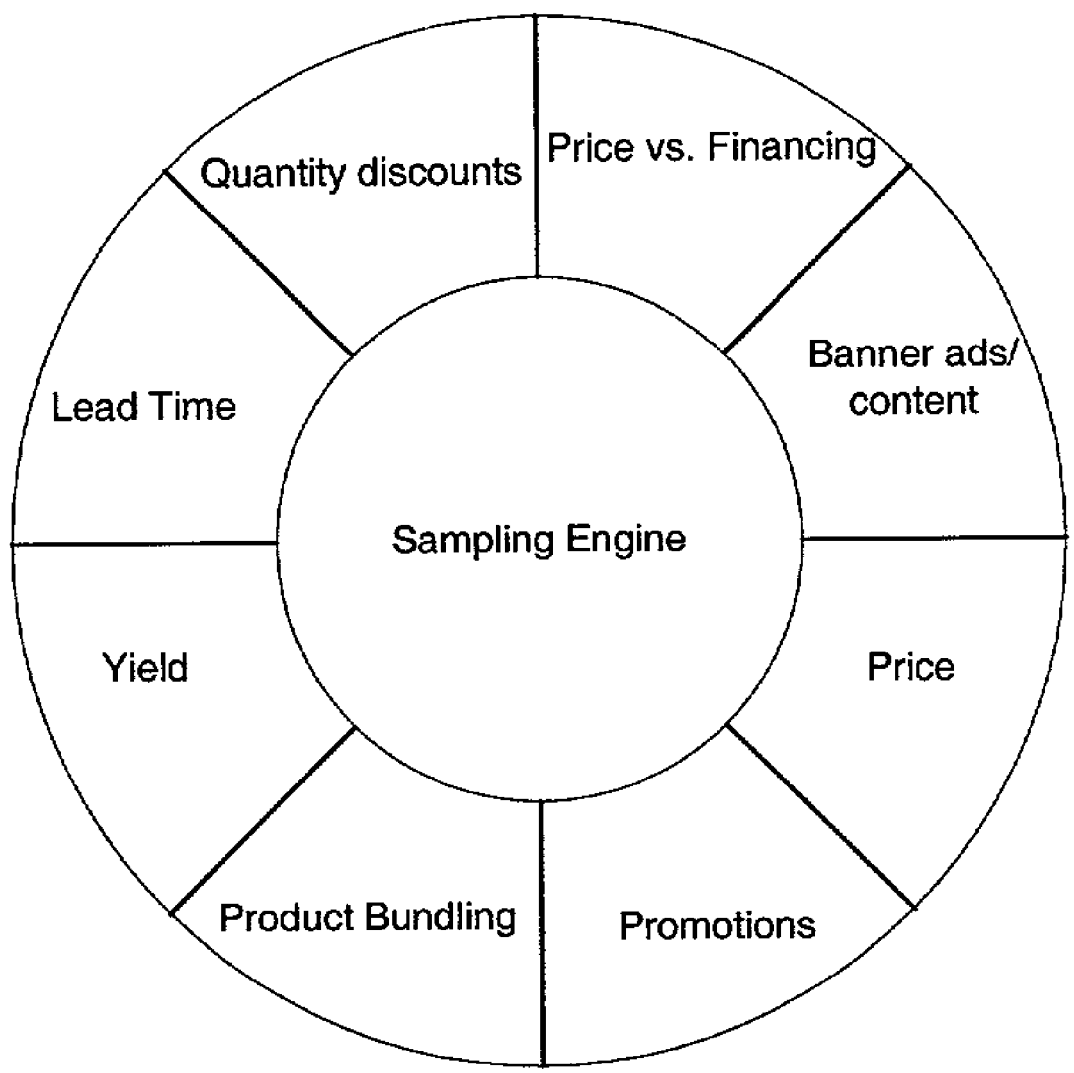
FIG. 5 is a diagram illustrating the relationship between the sampling engine of the present invention and various applications that use the sampling engine.

The dynamic sampling engine is the core of the inventive system. As shown by FIG. 5, it can be translated into modules for pricing, promotions, product bundling, yield management, lead time discounts, quantity discounts, price versus financing and banner advertisement content.

The pricing module is the focus of this application and is described below.

Dynamic Pricing

It is easy to change eCommerce prices by simply updating a Web page. In addition, it is possible to present different prices to different online customers without either customer learning the price that has been offered to the other. This may be accomplished by presenting different versions of the Webpage to different potential customers, for example. Because of these reasons, it is possible to perform controlled, real-time experiments on samples of the customer population to determine customer price sensitivities. This information can then be used to determine real-time optimal pricing and marketing strategies for an entire customer population or for selected segments of the customer population. In addition, merchants may learn from the online experiments, and apply this learning to offline counterpart market strategies.

The sampling experiments conducted by the method and system of the present invention are designed to measure different customer inclinations. For example, one area of measurement may be to measure customer inclination to purchase a product at differing prices. In this application, the price is deliberately varied by the inventive system during a sampling period, and statistics are kept by the system to determine what percentage of customers are likely to buy or exhibit interest in the product at the different offered prices. The statistics typically include, for example, the number of customers who actually purchased the product at each offered price point.

Given the percentage of customers who buy, or who exhibit a quantifiable interest in, the product at each price, the system is able to compute an optimal or near-optimal price for the product. The optimal price determined by the system is intended to optimize an economic variable, such as profit. The economic variable to be optimized may be financial, such as profit or revenue. Alternatively, the economic variable may be another quantity of interest, such as market share, customer satisfaction, customer retention at the website, or utilization of manufacturing or shipping resources, for example. The optimization typically determines the price at which an economic variable is maximized, although other types of optimization, such as minimizing an economic variable, are possible using the method and system of the present invention.

In one embodiment, the objective function may weigh multiple criterions. For example, the user may be trying to optimize both profit and market share. The objective function may be defined to be 75% weighted toward profit optimization and 25% toward market share retention. The inventive system in this case will determine which price optimizes this weighted multi-criterion function.

The dynamic pricing application allows companies to determine optimal prices by running continuous real-time models on an appropriate sample population, which may be determined automatically by the sampling engine. The dynamic pricing application may plot the determined demand function—price versus quantity—in a piecewise linear form.

Based on the objective, which may be to maximize revenue, or to reach a certain market share or a combination of both, once the demand function is plotted the system will suggest the optimal price. By interfacing to appropriate accounting systems to determine variable cost, the objective of maximizing profit (Quantity * (price—variable cost)) can be accomplished in real-time by the inventive system.

Figure 4:
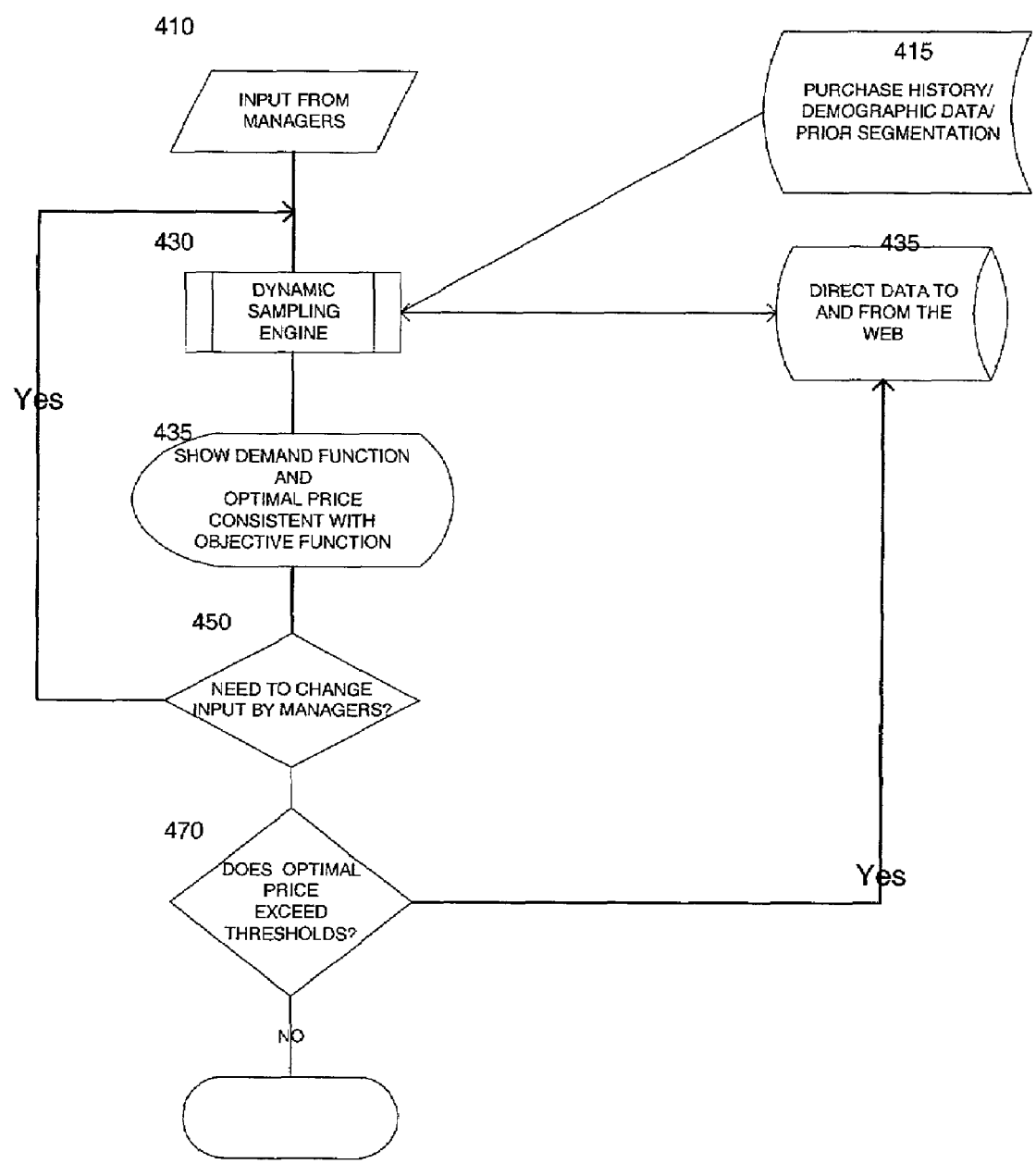
FIG. 4 is a flowchart illustrating the process used to perform dynamic pricing by the method and system of the present invention.

FIG. 4 illustrates an overall procedure for determining an optimal dynamic price. As shown in step 410, an employee for the Internet merchant first inputs data that is used by the inventive system to determine a sampling and optimization strategy. The employee is typically a manager-level employee for an Internet merchant. In this step, a product or service for which an optimal dynamic price is desired is first identified. This product may be a product that has historically exhibited varying demand behavior, or may be a new product being offered, for example.

The employee may also input sample price points. These sample prices typically include the current price, and a number of specified optional prices both above and below the current price. Preferably, a sufficiently large number of price points are tested so that there are enough price points to determine a smooth curve in the profit function. In an alternative embodiment, the employee may enter a range of prices, and the system may determine the intervals to be sampled. The system may take into account the cost of selling the products at various prices when determining the prices to be offered in the experiment.

The system may restrict the input in several ways. For example, the inventive system may require a minimum number of price points. As another example, the range of prices offered may be restricted to a certain interval by the method and system of the present invention. In this case, the sample sizes and desired statistical accuracies may be specified, and various mechanisms for limiting price changes may be implemented. For example, the price range may be restricted to a low price of cost to the seller to twice the existing price. The inventive system can be configured with preset price limitations to avoid selling or offering products at a loss greater than that desired by the Internet merchant, or can be programmed to require additional user confirmation before selling a price below a predetermined point.

The employee may specify whether the system is to conduct continuous sampling, or sample at discrete intervals. When the pricing experiment is conducted continuously or at varying closely spaced intervals, the prices match the instantaneous price customers are willing to pay.

The number of customers to sample for each price point is also determined, given the price range and intervals. This may be an absolute number of customers to be presented with each price. Alternatively, a time interval over which testing is to be performed may be defined, and the customers who visit the website during that period become the population. A random fraction of the population is the sample for the experiment. In either embodiment, it may be possible that during the accumulation of data it will become apparent prior to the end of the time period or before the absolute number of customers are sampled that a particular price point is optimal. In this case, since it is not necessary to continue the experiment to its normal completion, the sampling may be stopped.

The Internet merchant may also determine the customer population. In one embodiment, the population may include every potential customer that visits the website. Alternatively, the customer population may be clustered or segmented, and only customers that meet a certain profile are sampled. As an example, customers may be clustered into socioeconomic groups, and only customers in certain groups are sampled when determining an optimal price. Alternatively, the entire customer population may be segmented, with separate experiments run on each segment determining an optimal price for each segment. As another example, customers may be identified for sampling based upon purchasing history or other accumulated data. For example, the segmentation scheme may cluster customers based on purchase history: heavy buyers, light buyers and non-buyers. Segments may be determined from a combination of demographic variables and prior purchase histories.

Information used to determine segmenting, or to determine which customers to include in the sample population, may come from outside sources, as shown by data storage 415.

During the sampling process, the dynamic sampling engine 430 randomly samples potential customers according the parameters defined at 410. To accomplish this sampling, the Webserver distributes webpages 435 with the different prices to the different customers in proportion to the quantities and for the period of time determined in step 410.

Experimentation utilizing the dynamic sampling engine 430 may be repeated periodically to ensure that the optimal price is dynamically optimized to regularly compensate for market changes. Thus, experiments utilizing the dynamic sampling engine 430 may be run monthly, weekly, daily, hourly, or more often, until the experimentation becomes, practically speaking, continuous. Dynamic optimization, therefore, is a result of continuous experimentation. The optimum price may, furthermore, be propagated to the web at 435 for offering to customers each time a new optimum price is discovered by the dynamic sampling engine. Alternately either the system or the operator may propagate the optimum price each time the optimum price changes by a particular amount from the previous price such as, for example, $0.25. Data from the web, such as purchase, timing, and use of promotions by customers may also be provided to the dynamic sampling engine 430 for use in future samples.

Data is accumulated for each price point. This data typically include the fraction of customers who purchase the product or give other indication of intention of, or interest in, purchasing the product at each price point.

This process is repeated until sufficient purchasing information for each price point has been obtained. The resulting information is the empirical estimation of the piecewise linear demand function. Any functional form can be represented as a piecewise linear function.

If the population has been segmented, the sampling continues until the demand function can be estimated for each segment.

Once the absolute number of customers, or the time period determined in step 410, has been sampled, the data gathered by the dynamic sampling engine 430 is used to compute the price point that maximizes the economic variable(s) of interest.

As an example of simple profit optimization, consider a sample of n different prices $P_1, \ldots p_n$ offered to potential customers. The fraction of customers who purchase the product at price $p_i$ is given by $f_i$. The cost of the product to the supplier is c. The profit per unit at price $p_i$ is therefore $(p_i-c)$. If m customers consider the product, then the expected number of units sold will be m $f_i$. Using these variables, the expected profit for price i can be computed by the formula m $f_i$ $(p_i-c)$. Of the prices offered $p_1, \ldots p_n$, the optimal price to be charged is the $p_i$ which maximizes the expected profit equation m $f_i(p_i-c)$.

In an alternative embodiment, the price to be charged is not necessarily one of the tested prices $P_1, \ldots p_n$ but is allowed to lie between two tested prices. In this case, the appropriate maximization may be performed by using an interpolating function.

If the sample customer population is segmented, an optimal price may be determined for each group, and the webserver may be programmed to offer the different optimal prices to customers based upon segmentation.

If there are any unusual shifts in the demand function, such as a segment with an incorrect slope—where quantity increases when price increases, or where quantity decreases when price decreases—the system may automatically reexamine these parts of the demand function either through additional sampling or by taking finer intervals around these parts.

The demand function is presented to the user at 436. In addition, the optimal price that is consistent with the objective function is displayed.

In addition, the confidence intervals may be calculated. Methodologies for calculating confidence intervals are known to those skilled in the art. Confidence intervals are also displayed to the user.

If the experiment has not produced results that are conclusive to the manager, he may run the experiment again using different parameters, as shown by decision box 450. For example, in the experiment, the manager may have entered price points of $8, $9, $10 and $11. The experiment determines that $8 is the optimal price of these prices. However, the true optimal price may be lower than $8. The manager may run the experiment again using the price points of $6, $6.5, $7, $7.5, $8, $8.5 and $9 to obtain better results.

In one embodiment, the inventive system is programmed to automatically update the price for the product if the optimal price calculated by the system is within a predefined threshold. In this case, the web server is then programmed to deliver webpages for the indicated product at the determined optimized price, as shown by steps 470-435.

The prices that are propagated from the experiment to the customers may be conditioned on supplemental variables, such as length of time a potential customer spends visiting the site, the number of items purchased, total value of items purchased, prior purchasing history and seasonality.

Consider a specific example of an optimal price calculated by the inventive system. In this example, the current price of a product is $9.25. The user determines that he would like the price range to go from $8.00 to $9.50 at $0.25 intervals. The variable cost for this product is $6. The objective function in this example is to maximize profit. The user also configures the system to automatically change the price of the product if the optimal price determined by the system increases profit by 5% or more.

A manager for the Internet merchant estimates that 100,000 customers visit the website in a day. This estimate may be made used internal data or from historical data, for example. The Manager enters that the minimum sample size of 7%. (The sample size may be determined to achieve the desired levels of confidence intervals.) Therefore, of the 100,000 customers that visit the website, the dynamic sampling engine will pick out 7,000 to receive the webpages generated with the prices used in the experiment. The other customers who are not selected for the experiment receive the standard price webpage. In this example, 1,000 random customers will receive webpages for each of the 7 price points.

Other methods of sampling are known to those skilled in the art, and are intended to come within the scope of the present invention.

Table 1 illustrates a demand table calculated by the system of the present invention for this example.

TABLE 1

| Price | Estimated Demand Units | Profit |
| --- | --- | --- |
| $8.00 | 400 | $800 |
| $8.25 | 385 | $866.25 |
| $8.50 | 365 | $912.50 |
| $8.75 | 360 | $990.00 |
| $9.00 | 320 | $960.00 |
| $9.25 | 270 | $877.50 |
| $9.50 | 240 | $840.00 |

Profit is calculated by the equation: profit = (price − variable cost) × quantity.

As shown in Table 1, the estimated demand for the product at the price $8.00 is 400 units. Therefore the estimated profit at $8.00 is (8.00−6.00)*400=$800.00.

As shown, the price of $8.75 will maximize the profit in this example. This is a 12.8% increase over the current profit of $877.50, so the Website is automatically updated to use the optimal price of $8.75 for the entire population except any experimental sample.

The above example illustrates one method for sampling the population, other methods are known to those skilled in the art. For example, the size of the random sample may be determined based on the managers levels of confidence intervals. Many statistical methods are known to those skilled in the art. Furthermore, the following statistical references are incorporated by reference in their entirety: (a) Ross (1997), A First Course in Probability, Prentice Hall, Upper Saddle River, N.J.; (b) Gelman A., J. B. Carlin, H. S. Stern and D. B. Rubin (1995), Bayesian Data Analysis, Chapman & Hall, New York, N.Y.; (c) Malhotra, N. K. (1993), Marketing Research, Prentice Hall, Englewood Cliffs, N.J.; (d) Wedel, M and W. A. Kamakura (1998), Market Segmentation: Conceptual and Methodological Foundations, Kluwer Academic Publishers, Boston, Mass.; (e) Pudney (1989), Modelling Individual Choice: The Econometrics of Corners, Kinks and Holes, Basil Blackwell Limited, Oxford, United Kingdom; (f) Cinclair E. (1975), Introduction to Stochastic Processes, Prentice-Hall, Englewood Cliffs, N.J.; (g) Kalbfleisch, J. D. and R. L. Prentice, The Statistical Analysis of Failure Time Data, John Wiley & Sons, New York, N.Y.; and (h) Mitchell, T. M (1997), Machine Learning, McGraw-Hill, New York, N.Y. Those references describe statistical methods that may be utilized by the present invention.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A computer-implemented method for dynamically determining an optimal price to be charged for a product on an Internet website operated by an Internet merchant, said method comprising the steps of:
   (a) receiving configuration data from the Internet merchant, wherein such configuration data comprises a sample size of visitors to the Internet website who are to participate in experiments and time-related information concerning the experiments;
   (b) randomly choosing visitors to the website to participate in the experiments according to the configuration data:
   (c) running the experiments according to the configuration data on the randomly chosen visitors to create a model that reflects current market sensitivities concerning the product;
   (d) determining the optimal price for the product using the model acquired in step (c) by electronic manipulation using a processor; and
   (e) displaying the optimal price to the Internet merchant.

2. The method of claim 1, wherein said configuration data includes sampling parameters.

3. The method of claim 1, wherein said configuration data includes potential prices that are offered to the sampled population in step (c).

4. The method of claim 1, wherein said configuration data includes whether the sampling is to be performed continuously or at discrete intervals.

5. The method of claim 1, wherein said configuration data includes data for segmenting the population into clusters.

6. The method of claim 1, wherein said configuration data includes a minimum threshold for automatically propagating an optimal price.

7. The method of claim 1, wherein said random sampling is performed on the entire population of visitors to the website.

8. The method of claim 1, wherein visitors to the website are grouped, and each group is sampled separately.

9. The method of claim 1, wherein an optimal price is determined for each group.

10. The method of claim 9, additionally comprising updating the website such that a visitor is offered the optimal price determined in step (d) according to the visitor's group.

11. The method of claim 9, wherein groups are determined based upon prior purchasing behavior.

12. The method of claim 9, wherein groups are determined based upon demographic characteristics.

13. The method of claim 1, wherein step (d) comprises determining a price that optimizes profit.

14. The method of claim 1, additionally comprising:
   (f) automatically updating the website to use the optimal price determined in step (d).

15. The method of claim 1, additionally comprising:
   (f) automatically updating the website to use the optimal price determined in step (d) if the optimal price meets a minimum threshold.

16. The method of claim 15, wherein the minimum threshold is that the optimal price determined in step (d) is a predetermined percentage better than a currently offered price for the product.

17. The method of claim 1, wherein step (d) comprises determining a price that optimizes revenue.

18. The method of claim 1, wherein step (d) comprises determining a price that optimizes market share.

19. The method of claim 1, wherein step (d) comprises determining a price that optimizes customer satisfaction.

20. The method of claim 1, wherein step (d) comprises determining a price that optimizes a resource selected from the group consisting essential of shipping resources and manufacturing resources.

* * * * *